US006543959B1

(12) United States Patent
Jore

(10) Patent No.: US 6,543,959 B1
(45) Date of Patent: Apr. 8, 2003

(54) TWO-WAY QUICK CONNECTOR

(75) Inventor: Matthew B. Jore, Ronan, MT (US)

(73) Assignee: Jore Corporation, Pasco, WA (US)

( * ) Notice: Subject to any disclaimer, the term of this patent is extended or adjusted under 35 U.S.C. 154(b) by 0 days.

(21) Appl. No.: 09/548,846

(22) Filed: Apr. 13, 2000

Related U.S. Application Data

(60) Provisional application No. 60/129,113, filed on Apr. 13, 1999.

(51) Int. Cl.[7] ................................................ F16B 21/00

(52) U.S. Cl. .............................. 403/322.2; 408/239 R; 279/74; 279/75; 279/30

(58) Field of Search ........................... 279/74, 75, 905, 279/30, 82; 403/322.2; 408/239 R; 173/132

(56) References Cited

U.S. PATENT DOCUMENTS

| | | | | |
|---|---|---|---|---|
| 1,468,732 A | * | 9/1923 | Bradbury | 279/75 X |
| 1,873,173 A | * | 8/1932 | Anderson | 279/158 |
| 3,767,218 A | * | 10/1973 | Linthicum et al. | 279/75 |
| 4,577,875 A | | 3/1986 | Miyakawa | |
| 4,692,073 A | | 9/1987 | Martindell | |
| 5,352,074 A | | 10/1994 | Ishikawa | |
| 5,398,946 A | | 3/1995 | Quiring | |
| 5,586,847 A | | 12/1996 | Mattern, Jr. et al. | |
| 5,934,384 A | * | 8/1999 | Wang | 279/75 X |
| 5,996,452 A | * | 12/1999 | Chiang | 279/75 X |
| 6,199,872 B1 | * | 3/2001 | Hasan | 279/75 X |

* cited by examiner

*Primary Examiner*—Lynne H. Browne
*Assistant Examiner*—Ernesto Garcia
(74) *Attorney, Agent, or Firm*—Christenson O'Connor Johnson Kindness PLLC

(57) ABSTRACT

A two-way quick connector for connecting a power drill to a working tool having a working end and a shank end having a circumferential groove. The connector having a drive shaft with a polygonal-shaped chuck end to be received by the chuck of a power drill, and a cylindrically-shaped opposite end having an axial bore for receiving the shank end of the working tool. The connector further having a ball detent and a two-piece slidable sleeve mounted on the drive shaft, which sleeve may be manipulated in either of two directions to manipulate the ball detent into the circumferential groove of the working tool.

2 Claims, 3 Drawing Sheets

TWO-WAY QUICK CONNECTOR

This application claims the benefit of Provisional Application No. 60/129,113 filed Apr. 13, 1999.

BACKGROUND OF THE INVENTION

The present invention relates to a two-way quick connector chucked in a power drill chuck. With either a pulling or pushing motion by an operator's thumb, an operator is able to quickly remove or insert a power bit with a hexagonal shank into the two-way connector.

Quick release chucks for screwdriver bits are known in the art. For example, see U.S. Pat. No. 4,692,073 to Martindell, which shows a quick release chuck having a sleeve for manipulating a ball detent in and out of a groove located in a shank of a screw driver bit. This patent shows a sleeve which may be manipulated in only one direction to lock and unlock the ball detent. Further, U.S. Pat. No. 5,586,847 to Mattern, Jr., et al. shows a power tool adapter using a slidable sleeve for manipulating a ball detent in and out of a groove located in a power tool assembly. The sleeve in the Mattern, Jr. reference shows a sleeve which may be manipulated in two directions.

The present invention describes a two-way quick connector which is designed to have a compact shape and can be used with any of the various types of power tools having a groove located in the shank of the power tool. The ball detent sleeve may be manipulated in either direction, either by pulling on the sleeve or by pushing on the sleeve, and can be easily operated with an operator's thumb. Further, the present invention describes a simple two-way connector which is easy to manufacture.

SUMMARY OF INVENTION

A two-way quick connector for connecting a power drill having a chuck to a working tool having a working end and a polygonal-shaped shank end with the shank end having a circumferential groove. The connector having a drive shaft with a polygonal-shaped chuck end to be received by the chuck of the power drill and a cylindrically-shaped opposite end having a polygonal-shaped axial bore for receiving the polygonal-shaped shank end of the working tool. The connector further includes a first and second collar frictionally interlocked together which are slidably mounted on the drive shaft for slidable movement in either of two directions to manipulate a ball detent into and out of engagement with the circumferential groove of the working tool.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
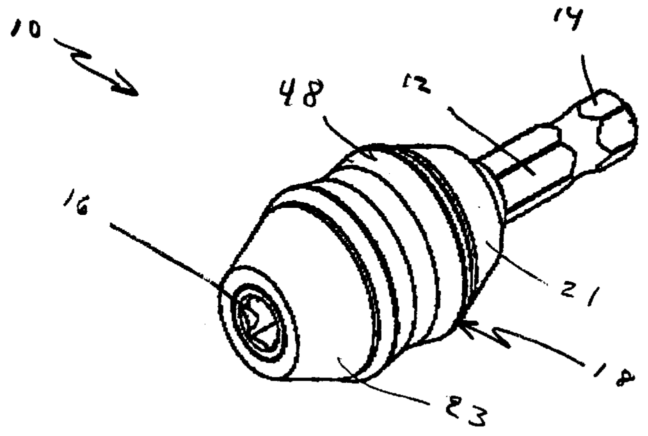
FIG. 1 is a perspective view of a two-way quick connector according to the present invention.
Figure 3:
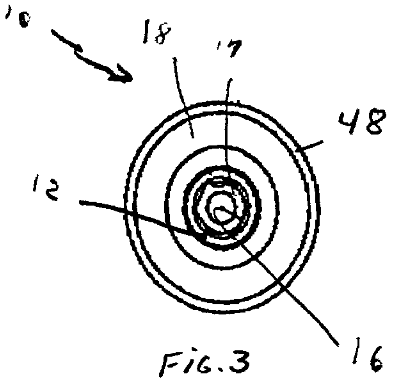
FIG. 3 is a left side view of the two-way quick connector shown in FIG. 2.
Figure 2:
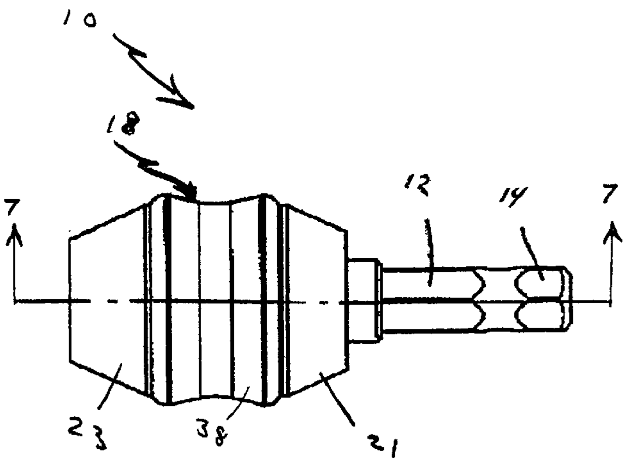
FIG. 2 is an elevational view of the two-way quick connector shown in FIG. 1.
Figure 4:
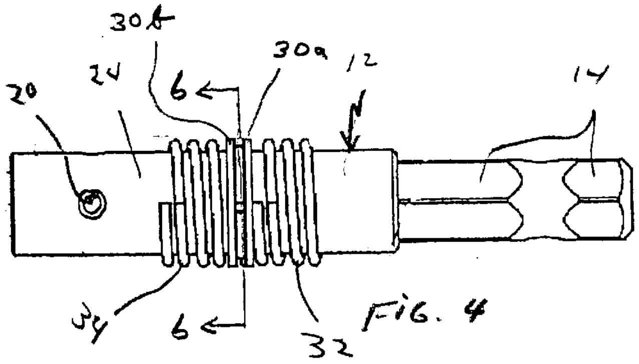
FIG. 4 is an elevational view of a shaft shown in FIG. 1.
Figure 5:
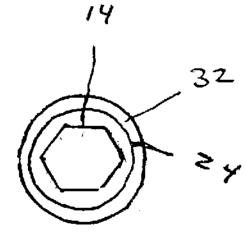
FIG. 5 is a right side view of the shaft shown in FIG. 4.
Figure 7:
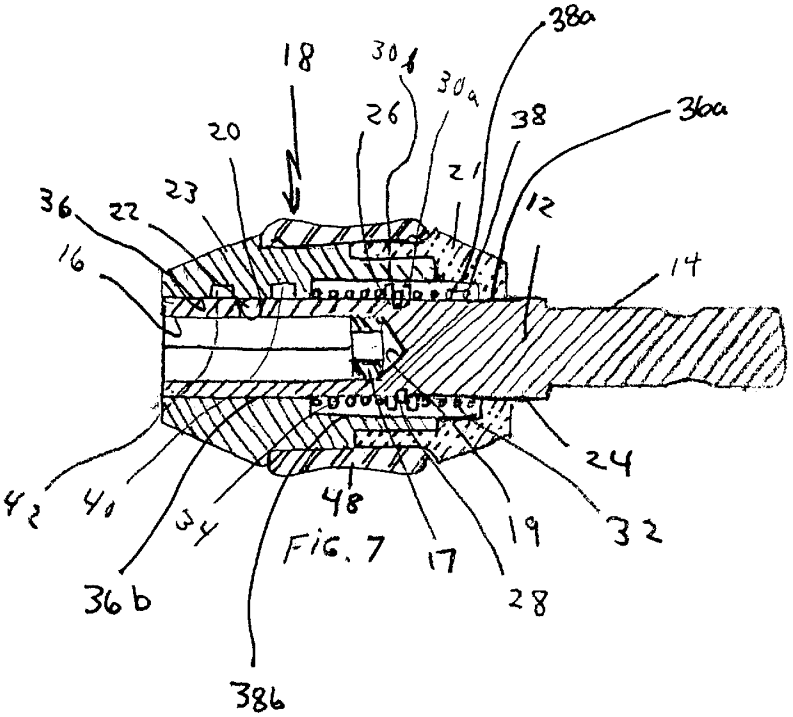
FIG. 7 is a cross-sectional view of the two-way quick connector taken along the line 7—7 in FIG. 2.

A two-way quick connector 10 is shown in perspective in FIG. 1. Quick connector 10 includes a shaft 12 having a hexagonally shaped chuck end 14 transitioning into an end 24 having a circular cross-section, as shown in FIG. 4. At the circular end 24 of shaft 12, a hexagonally shaped axial end bore 16 is provided, terminating with a drill run-out cone 19 as seen in FIG. 7. Hexagonal bore 16 is sized and shaped to receive a conventional power bit with a hexagonal shank. As best seen in FIG. 7, plug 17 is positioned in hexagonal bore 16 to fill some of the space, if desired, adjacent drill run-out cone 19.

As best seen in FIG. 7, shaft 12 includes a radially extending tapered hole 20, extending through a wall of shaft 12 to bore 16. The tapered hole 20 is oriented to have the smaller cross-section of the tapered hole located adjacent to bore 16. A spherical bearing on ball detent 22 is inserted in tapered hole 20. Spherical bearing on ball detent 22 is sized to fit into tapered hole 20 so that a portion of the spherical bearing can extend into bore 16. The smaller cross-section of tapered hole 20 is sized to be smaller than the diameter of bearing 22, to prevent bearing 22 from passing into bore 16.

Figure 6:
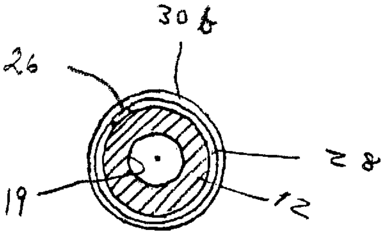
FIG. 6 is a cross-sectional view of the shaft taken along the line 6—6 in FIG. 4.

A groove 26 is cut on the periphery of circular portion 24 of shaft 12, as best seen in FIGS. 6 and 7. Groove 26 is sized to accept a "C" ring 28. Circular washers **30*a* and 30*b* are positioned on either side of this "C" ring 28. A first coil spring 32 is placed in surrounding relation with circular end 24 of shaft 12, on one side of washer 30*a*. A second coil spring 34 is placed in surrounding relation with circular end 24 of shaft 12, having one end adjacent washer 30*b***.

Figure 9:
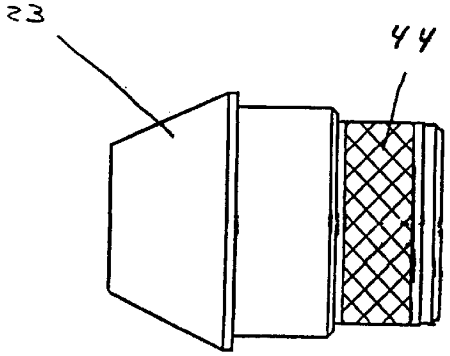
FIG. 9 is an exterior elevational view of the second collar portion shown in FIG. 8.
Figure 11:
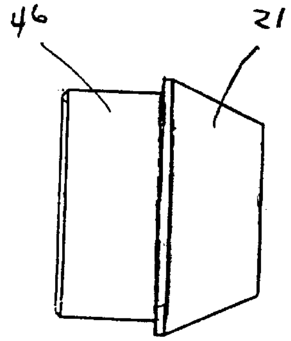
FIG. 11 is an exterior elevational view of the first collar portion shown in FIG. 10.

A tubular collar 18, as shown in FIG. 7, is positioned in surrounding relation to circular end 24 of shaft 12. Collar 18 includes an axial bore 36 sized to be slightly larger than circular end 24 of shaft 12 to allow collar 18 to be fit on circular end 24. Collar 18 is constructed with a first collar portion 21 and a second collar portion 23, which interlock together as shown in FIG. 7. Each of the first and second collar portions 21 and 23 having an axial bore **36*a* and 36*b* therethrough and sized to slidably receive the shaft 12 and positioned in surrounding relationship with the shaft 12. The axial bores 36*a* and 36*b* of the first and second collar portions 21 and 23 define the diameter of the axial bore 36 of the collar 18. As best seen in FIG. 9, second portion 23 of collar 18 has a reduced diameter portion 44 having a knurled exterior surface. Portion 21 of collar 18 has a tubular flange 46 sized to fit over knurled exterior surface 44 to tightly hold the collar portion 23 and collar portion 21** together.

Collar 18 further includes a first cavity 38 which has a diameter larger than bore 36, and is sized to accept first and second coil compression springs 32 and 34, washers **30*a* and 30*b*, as well as "C" ring 28, as shown in FIG. 7. As seen best by referring to FIG. 7, the first and second collar portions 21 and 23 each include a stopped axial bore 38*a* and 38*b* formed with one end of the collar portions 21 and 23. The stopped axial bores 38*a* and 38*b* of the first and second collar portions 21 and 23 are annular in configuration and are equal in diameter. As configured, and when the first and second collar portions 21 and 23 are coupled, the stopped axial bores 38***a* and 38*b* define the first cavity 38 of the collar 18. The axial ends of cavity 38 are spaced apart sufficiently to provide only slight compression of coil springs 32 and 34.

Figure 8:
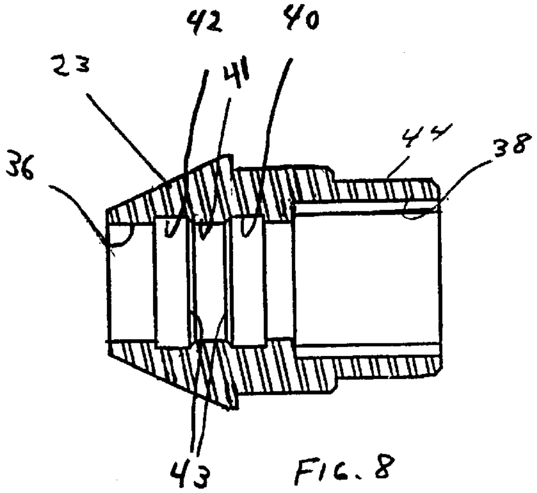
FIG. 8 is an enlarged cross-sectional view of a second collar portion shown in FIG. 7.
Figure 10:
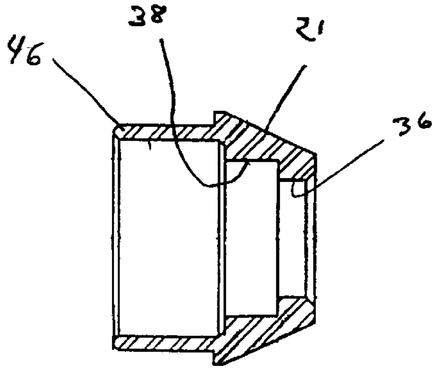
FIG. 10 is an enlarged cross-sectional view of a first collar portion shown in FIG. 7.

In addition, collar portion 23 includes a groove 40 and a second groove 42 which are cut into portion 23 in spaced apart relation and facing bore 36, as best seen in FIG. 8. A land 41 is provided between grooves 40 and 42. Grooves 40 and 42 are sized to accept a portion of spherical bearing 22 if either of these cavities move over, the bearing 22 positioned in tapered hole 20. The walls 43 of grooves 40 and 42 are tapered, as best seen in FIG. 8. Tapered walls 43 allow bearing 22 to easily move in and out of grooves 40 and 42.

Collar 18 also has a grip sleeve 48 which rests in a medial cut-out of portions 21 and 23 of collar 18, as shown in FIG. 7.

In operation, chuck end 14 of connector 10 may be clamped into the chuck of a power drill. An operator's thumb may then be placed on grip sleeve 48 to move collar 18 either in a forward direction or a rearward direction. This movement compresses either first or second coil spring 32 or 34. This movement also places either second groove 40 or groove 42 over spherical bearing 22, so that the spherical bearing, while being retained by tapered hole 20, can be completely pushed out of bore 16 and partially into one of the cavities 40 or 42. With bearing 22 removed from bore 16, a conventional power bit, having a hexagonal shank and an external groove circumferentially cut around the hexagonal end, may be inserted into bore 16. Then, as the operator releases pressure on grip sleeve 44, first or second coil spring 32 or 34 act against washer 30*a* or 30*b* to re-center collar 18 by equalizing spring pressure about the "C" ring 28. When this occurs, the land 41 between grooves 40 and 42 is positioned over spherical bearing 22, thereby forcing spherical bearing 22 into bore 16 and further into the indented groove of the conventional power bit, to lock the conventional power bit in place.

The ability of collar 18 to move in either direction allows an operator to insert a conventional power bit in a very natural manner, depending upon the desires of the user. This connector allows one-handed operation of the tool connector to remove power bits and insert bits or other tools in an easy and convenient manner.

Further, by utilizing a separable two-piece collar 18 for manipulating the ball detent, the connector 10 can be easily manufactured. With one of the collars 21 or 23 removed, the springs 32 and 34 can be easily inserted and then the collars 21 and 23 locked together to hold the springs in place and properly position the second collar 23 for manipulating the ball detent 22.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims.

I claim:

1. A two-way quick connector for connecting a power drill having a chuck to a working tool having a working end and a polygonal-shaped shank end with the shank end having a circumferential groove, the connector comprising:

a drive shaft having a longitudinal axis, a polygonal-shaped chuck end to be received by the chuck of the power drill, and a cylindrically-shaped opposite end having a polygonal-shaped axial bore extending partially through the drive shaft for receiving the polygonal-shaped shank end of the working tool;

a radially extending tapered hole extending through a wall of the drive shaft into the axial bore, the hole tapering inwardly toward a smallest diameter located adjacent the axial bore of the drive shaft;

a ball having a diameter sized slightly more than the smallest diameter of the radially extending tapered hole and disposed within the radially extending tapered hole to extend through the wall of the drive shaft into the axial bore of the drive shaft and into the circumferential groove of the working tool;

a first elongate collar portion having a first axial bore therethrough sized to slidably receive the cylindrically-shaped end of the drive shaft, and a stopped axial bore having a diameter greater than the first axial bore;

the first elongate collar portion disposed in surrounding relation with the cylindrically-shaped end of the drive shaft;

the stopped axial bore positioned to extend in the direction of the cylindrically-shaped opposite end of the drive shaft to receive the working tool;

a second elongate collar portion having a first axial bore therethrough having the same diameter as the first axial bore in the first elongate collar portion, and a stopped axial bore having a diameter the same as the diameter of the stopped axial bore of the first elongate collar portion;

the second collar portion disposed in surrounding relation with the cylindrically-shaped end of the drive shaft, the stopped axial bore positioned to communicate with the stopped axial bore of the first collar portion;

the second collar portion being further provided with a pair of spaced-apart interior grooves opening into the first axial bore of the second collar portion with a land extending between the two grooves;

the grooves positioned with respect to the ball so that the land between the grooves pushes the ball toward the axis of the shaft;

means for frictionally interlocking the first collar portion and the second collar portion together with the stopped bore of the first collar portion and the stopped bore of the second collar portion joined together to form a cavity;

a stop ring fixedly secured on the drive shaft, said stop ring positioned to extend into the cavity;

a first coil compression spring positioned in the cavity between a terminal end of the stopped bore of the first collar portion and the stop ring; and a second compression coil spring positioned in the cavity between a terminal wall of the stopped bore of the second collar portion and the stop ring;

whereby the first spring and the second spring co-act together in an unbiased and neutral condition to position the land of the first collar portion over the ball to force the ball into the axial bore of the drive shaft, and when the first and second collar portions are moved together on the drive shaft in one direction or the reverse direction against the bias force of one of the springs, a tapered wall of one of the grooves forces the ball out of the tapered hole in the drive shaft and into a corresponding groove.

2. The connector according to claim 1 further including a grip sleeve circumferentially surrounding the first and second collar portions interlocked together.

* * * * *